United States Patent [19]

Russell

[11] 3,867,580

[45] Feb. 18, 1975

[54] RECEIVING CIRCUITS FOR DIGITAL SIGNAL DISTRIBUTION SYSTEMS

[75] Inventor: Stanley L. Russell, West Webster, N.Y.

[73] Assignee: Stromberg-Carlson Corporation, Rochester, N.Y.

[22] Filed: Dec. 29, 1972

[21] Appl. No.: 319,244

[52] U.S. Cl. .......... 179/16 EA, 307/311

[51] Int. Cl. .......... H04b 3/36, H04b 15/00

[58] Field of Search .......... 179/16 R, 16 A, 16 AA, 179/16 E, 16 EA, 16 EC, 16 F, 18 GF, 18 H; 307/311, 132 T; 317/124, 125; 178/2 R, 3

[56] References Cited

UNITED STATES PATENTS

| | | | |
|---|---|---|---|
| 3,304,430 | 2/1967 | Biard et al. | 307/311 |
| 3,321,631 | 5/1967 | Biard et al. | 307/311 |
| 3,410,961 | 11/1968 | Slana | 179/18 FA |
| 3,492,488 | 1/1970 | Goettelmann | 307/311 |
| 3,504,127 | 3/1970 | Slana | 179/16 F |
| 3,535,532 | 10/1970 | Merryman | 307/311 |
| 3,629,590 | 12/1971 | Case | 307/311 |
| 3,691,403 | 9/1972 | Newmeyer | 307/311 |
| 3,767,978 | 10/1973 | Wernli | 317/124 |
| 3,783,198 | 1/1974 | Couch | 179/16 AA |
| 3,801,837 | 4/1974 | Pease et al. | 307/311 |

*Primary Examiner*—Ralph D. Blakeslee
*Assistant Examiner*—Randall P. Myers
*Attorney, Agent, or Firm*—William F. Porter, Jr.

[57] ABSTRACT

A plurality of receiving circuits are connected for receiving digital signals from a cable, each receiving circuit including an optoelectronic coupler for transmitting the digital signals from the cable to a using circuit. The threshold circuit can be used with the optoelectronic coupler for providing a signal squaring function if desired.

7 Claims, 1 Drawing Figure

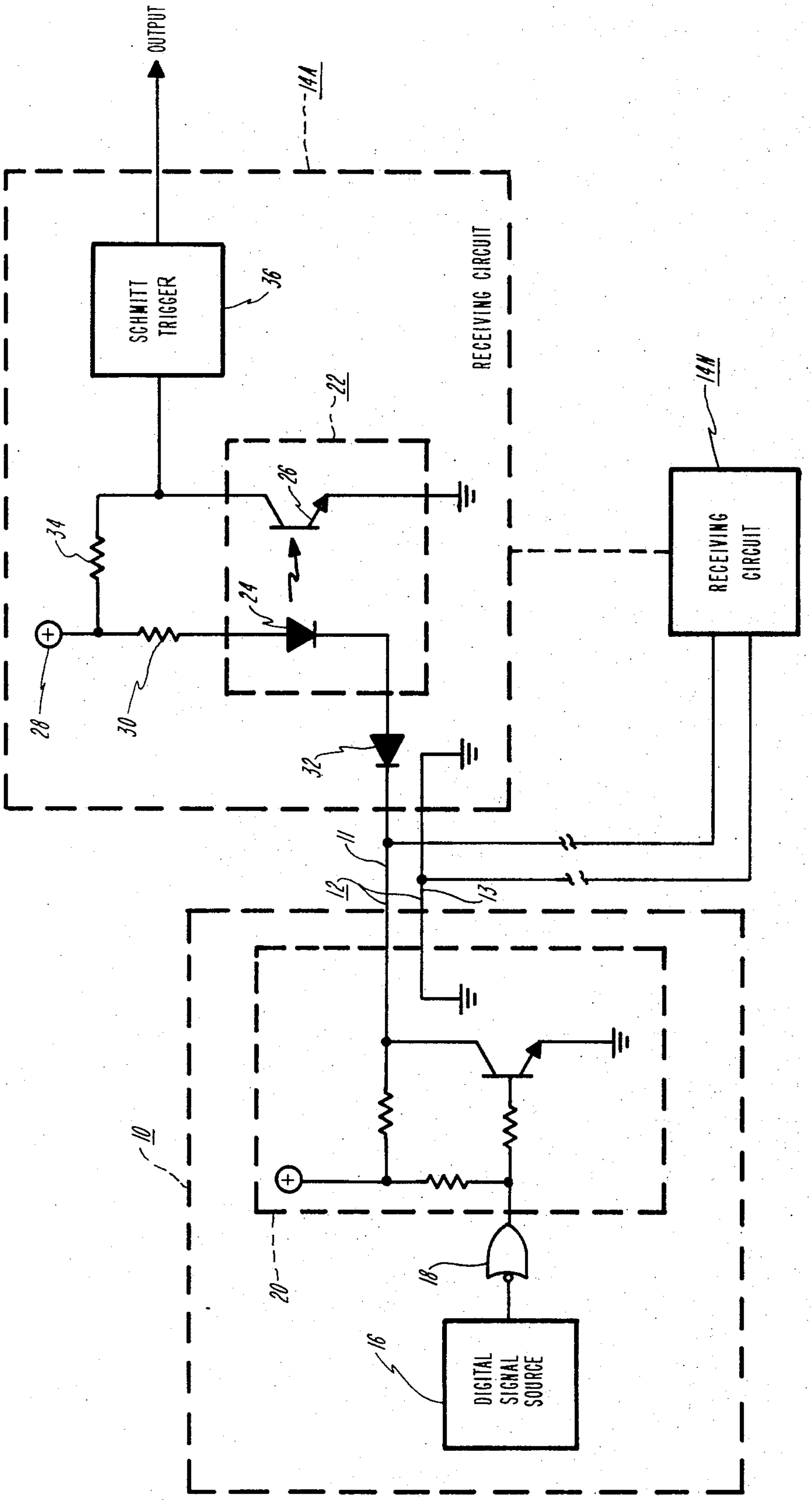
OUTPUT
14A
SCHMITT TRIGGER
36
RECEIVING CIRCUIT
22
26
34
24
28
30
32
11
12
13
14N
RECEIVING CIRCUIT
10
20
18
16
DIGITAL SIGNAL SOURCE

RECEIVING CIRCUITS FOR DIGITAL SIGNAL DISTRIBUTION SYSTEMS

BACKGROUND OF THE INVENTION

This invention pertains in general to electrical signal transmission over cables and more particularly to the distribution of digital signals.

A signal distribution system may include a series of pulses, such as clock pulses or special timing pulses, that are distributed throughout the system to provide a means for synchronizing switching activity. The signals may be distributed in cable bunches which extend for relatively long distances resulting in signal distortion, signal phase shift, plus noise problems. The digital signals are distorted due to crosstalk between adjacent conductors wherein a pulsing signal on the conductor may cause noise spikes to occur on another, and due to the distributed resistance, inductance and capacitance of the conductor that interact to distort the rise and fall time of the digital signals. The problem faced by such signal distribution systems is to be able to accurately and reliably transmit digital signals from the source to the reception points with a minimum amount of distortion.

Various attempts have been made in the prior art to reduce the problems concerned with the transmission of digital signals. For example, one prior art approach converts low level logic switching signals into high level signals and employs a point to point distribution scheme using a converter at each end. Point to point distribution means the transmission of signals from one source to one receiver via a single cable pair. This arrangement reduces the susceptibility of the system to low level noise, however, since the coupling between cable leads is primarily through capacitance, a differentiating circuit arrangement results wherein the high level switching signals are transmitted to other leads in the cable as high level voltage spikes. To reduce the susceptibility of the high level converters to the high level voltage spikes, the response time of the converters is reduced to a point so that the converters do not respond to the high frequency high level noise spikes. However, this results in a severe limitation on the repetition rate of the signals that can be transmitted by this system. For example, if a signal having a repetition rate is applied to the distribution system that exceeds the response time of the converters, the signal may end up as either being a saw tooth or triangular type wave at the receiving circuit. In addition to the foregoing, the use of the converters for converting the low level signals to high level signals requires a common ground circuit therebetween which may introduce further noise into the system due to the common grounding arrangement. Another point to point signal distribution arrangement used in a prior art includes a differential line driver and a differential line receiver connected therebetween by a twisted pair of conductors. This type of arrangement eliminates common mode noises, i.e., extraneous noises that are coupled to both wires of the twisted pair, each having the same polarity and phase. This type of point to point arrangement allows the use of low level signalling. In each of the point to point signal distribution systems, a separate cable pair is required for each signal to be transmitted. This point to point arrangement is rather expensive, requiring at least a pair of converter circuits, or a pair of differential circuits, for each signal to be transmitted.

Another signal distribution arrangement of the prior art uses a common signal bus with capacitive coupling between the source and the plurality of receiving circuits so that a single line can provide the timing or synchronizing signals to a plurality of receiving circuits. The capacitive coupling has the advantage of isolating a receiving circuit in the event of a failure therein so that a failure in a receiving circuit will not prevent the transmission of digital signals to the other receiving circuits. The capacitive coupling has the disadvantage of limiting the low frequency range of signals that can be transmitted wherein the size of the capacitors required to transmit the low frequency signals, such as those of three second duration, is prohibitive.

Another signal distribution arrangement of the prior art uses transformer coupling rather than capacitive coupling thereby providing the low frequency pulse distribution capabilities. However, the transformer arrangement has several limitations, one of which is a high frequency limitation and the other one being cost wherein a separate transformer is required for each receiving circuit. This is particularly troublesome in telephone systems wherein several thousands of pulse type transformers may be required.

It is therefore an object of this invention to provide a new and improved pulse distribution circuit.

It is also an object of this invention to provide a new and improved pulse distribution circuit for distributing pulses along a common bus without requiring capacitive or transformer coupling.

It is also an object of this invention to provide a new and improved signal distribution system for use with a common bus that provides electrical isolation between the transmitting and receiving circuits without the use of capacitive or transformer coupling.

It is a further object of this invention to provide a new and improved semiconductor signal distribution circuit that provides a cost savings arrangement and allows the manufacture by automatic printed circuit board mounting techniques.

BRIEF DESCRIPTION OF THE INVENTION

Receiving circuits are provided for a signal distribution system for transmitting digital signals received from a signal source via a common cable to a plurality of using circuits. The receiving circuits include a semiconductor device including input circuit having a radiation source that generates radiation, the intensity of which is a function of the current flow therethrough, and an output having a radiation sensitive device, the impedance of which is a function of radiation received from said source, said input and output circuits being electrically isolated. The input circuit of the semiconductor device is connected to the common cable so that in response to digital signals applied to the cable, the semiconductor device repeats these signals. Whenever driving a critical circuit, the output of semiconductor device can be connected to a threshold type circuit for squaring the digital signals received from the cable. The arrangement is such that a solid state receiving circuit is provided for use in a common bus distribution circuit. Each receiving circuit, by the use of the specified semiconductor device, has the capability of withstanding high voltage noise transients and pulses without being subject to failure and also minimizes the reactive components connected to the cable thereby limiting the distortion of the signals transmitted thereon to the distributed reactive components in the cable. A further feature of the invention includes the use of a diode connected in series with the input circuit as a protective device to inhibit a failure of a receiving circuit from preventing the transmission signals to other receiving circuits.

BRIEF DESCRIPTION OF THE FIGURES

The FIGURE includes a digital signal distribution system including a plurality of receiving circuits embodying the invention.

DETAILED DESCRIPTION OF THE INVENTION

Referring now to the FIGURE, a source 10 is connected via a two lead common bus 12 to a plurality of receiving circuits 14A–14N. The common bus 12 includes a signal line 11 and a ground line 13. The source 10 is illustrated as having a digital signal generating circuit 16 which is coupled to the common bus 12 via an inverter circuit 18 and a transistor driver circuit 20. The transistor driver circuit 20 is a standard well known circuit that provides the necessary power to drive the plurality of the receiving circuits 14A–14N.

Each receiving circuit 14A–14N includes an optoelectronic coupler 22. The optoelectronic coupler 22 includes a photon radiation source such as a light emitting diode (LED) 24 and a photon sensitive or photosensitive transistor 26. The light emitting diode 24 and the transistor 26 are electrically isolated from each other and are included in a hermetically sealed package. The breakdown voltage between the diode 24 and the transistor 26 is in the order of 1500–2500 volts. Radiation from the light emitting diode 24 functions as an equivalent of base current to render the transistor 26 conductive. The operation of the optoelectronic coupler 22 is fully described in detail in an article entitled, "Look At What Optical Semiconductors Do Now" by Michael F. Wolff, pages 32–34 in the June 28, 1963 issue of "Electronics".

The light emitting diode 24 is connected between a positive power terminal 28 and the common bus 12 via a resistor 30 and a diode 32. The collector of the transistor 26 is connected to the positive power terminal 28 via a resistor 34, while the emitter is connected to ground. The diode 32 provides a protection feature in the event that diode 24 should breakdown. The collector of the transistor 26 is also connected to a threshold type circuit such as, for example, a Schmitt trigger 36.

The arrangement is such that in response to a ground going pulse from the source 16, the transistor driver circuit 20 is driven into saturation grounding the lead 11 of a common bus 12. When the lead 11 is grounded, currents flow through each of the receiving circuits 14A–14N from the positive terminal 28 through the resistor 30, the light emitting diode 24, and the diode 32 causing photon radiation from the light emitting diode 24 to render the transistor 26 conductive. The value of the resistor 30 is selected so that when the line 11 is grounded sufficient current flow flows through the light emitting diode 24 to drive the transistor 26 into saturation.

The Schmitt trigger circuit 36 is used to square up the pulses transmitted over the common bus 12 since it is possible that due to the length of the common bus and the capacitive and inductive and resistive distributed components therein the signal may be distorted to include a slow rise or fall time. The signal transmitted by the bus is repeated by the optoelectronic coupler 22 which in turn drives the Schmitt trigger to produce an output signal having a rapid rise and fall time. Depending upon the circuit to be driven by the optoelectronic coupler 22, the Schmitt trigger circuit 36 can be eliminated. For example, if the optoelectronic coupler is to be connected gating circuits, it is important that the rise time of the switching signal be rapid, so that the gating circuit will not be switched slowly through its linear operating range. When a gating circuit is switched slowly, the gating circuit is susceptible to oscillation and thereby may undesirably generate noise. On the other hand, if the rise time is not critical, such as in the case of a relay circuit, the Schmitt trigger circuit 36 can be eliminated.

The invention provides for a low cost semiconductor signal distribution system with sufficient electrical isolation between the distribution circuit and the receiving circuit. The receiving circuit includes solely semiconductor devices thereby eliminating the need for any capacitive or inductive components and thereby minimizing the pulse distortion over the common bus due to distributed components in the common bus itself. In addition to the foregoing, the optoelectronic coupler 22 uses relatively little power so that a single driver circuit can drive a large number of such receiving circuits. On the other hand, the optoelectronic coupler 22 requires at least two microseconds of current flow through the diode 24 requiring a noise pulse having sufficient energy to energize the diode 24, which is not usually the case with noise pulses. In addition to the foregoing, if a threshold circuit 36 is used even the higher level noise pulses can be eliminated. As a result, the use of the optoelectronic coupler has the added advantage of reducing noise transmission.

What is claimed is:

1. In a signal distribution system for transmitting digital signals, having first and second states, from a signal source to a plurality of receiving circuits over a common cable, each said receiving circuit comprising:

a semiconductor device including an input circuit having a light emitting diode that generates radiation, the intensity of which is a function of current flow therethrough, and an output circuit having a phototransistor, the impedance of which is a function of the intensity of radiation received from said light emitting diode, said input and output circuits being substantially electrically isolated from each other;

circuit means for connecting said input circuit to said cable so that in response to the application of a digital signal having the first state to said cable said source becomes energized, and in response to a digital signal having the second state said source is deenergized;

circuit means connected to said output circuit so that said output circuit generates output signals in response to the digital signals on said cable, and threshold and wave squaring circuit means connected to said output circuit for producing digital output signals when said output signals generated by said output circuit exceed a preset level.

2. A receiving circuit as defined in claim 1 wherein: said cable includes a pair of leads, one of said leads defining a ground wire between said signal source and said receiving circuits;

said circuit means for connecting said input circuit connects said input circuit between a power supply terminal and one of said cable leads, and said circuit means connecting said output circuit connects said output circuit between said power supply terminal and the other one of said cable leads.

3. A receiving circuit as defined in claim 1 wherein:

said cable includes a pair of leads, one of said leads defining a ground wire between said signal source and said receiving circuits;

said semiconductor device is an optoelectronic coupler including a light emitting diode in the input circuit and a photosensitive transistor in the output circuit;

said circuit means for connecting said input circuit connects said diode in a direct current series circuit with resistive means, between a power supply terminal and one of said cable leads, and said circuit means connecting said output circuit connects said transistor between said power supply terminal and the other one of said cable leads.

4. A receiving circuit as defined in claim 3 wherein:

said circuit means for connecting said input circuit includes a diode connected in said series circuit and poled for conduction in the same direction as said light emitting diode.

5. A signal distribution system as defined in claim 1 wherein said semiconductor device has a minimum response time of at least two microseconds.

6. A signal distribution system comprising:

a cable pair;

a source of digital signals connected to apply digital signals to said cable pair;

a plurality of receiving circuit means, each including an optoelectronic coupler circuit having a light emitting diode and a photosensitive transistor located proximately to said diode and being optically coupled thereto, connected to said cable pair; wherein the diodes are connected in a direct current circuit between one lead of said cable pair and power supply terminals of corresponding receiving circuits and the transistors are connected between said power supply terminals and the other lead of said cable pair said other lead defining a ground wire between the signal source and the plurality of receiving circuits; the arrangement being such that said transistors repeat the digital signals received from said cable pair when applied to said diodes.

7. A signal distribution system as defined in claim 6 including:

threshold and wave squaring circuit means for each receiving circuit connected to said transistors for repeating the digital signals from said transistors when the signal exceeds a preset level and for squaring the edges of said signals.

* * * * *